United States Patent [19]
Acharya

[11] Patent Number: 6,108,453
[45] Date of Patent: Aug. 22, 2000

[54] GENERAL IMAGE ENHANCEMENT FRAMEWORK

[75] Inventor: Tinku Acharya, Tempe, Ariz.

[73] Assignee: Intel Corporation, Santa Clara, Calif.

[21] Appl. No.: 09/154,176

[22] Filed: Sep. 16, 1998

[51] Int. Cl.$^7$ .................................. G06T 5/00; G06T 5/50
[52] U.S. Cl. ........................... 382/254; 382/266; 382/275
[58] Field of Search ..................................... 382/254, 260, 382/263, 264, 266, 269, 275, 300; 358/447, 463, 525, 530, 532; 345/136, 137

[56] References Cited

U.S. PATENT DOCUMENTS 5,717,789    2/1998   Anderson et al. ....................... 382/254

*Primary Examiner*—Scott Rogers
*Attorney, Agent, or Firm*—Blakely, Sokoloff, Taylor & Zafman LLP

[57] ABSTRACT

A method comprising forming an approximated image from an original input image, forming a pre-enhancement map by differentiating the approximated image from the input image, enhancing the pre-enhancement map according to an image enhancement technique forming an enhanced map thereby, and combining the enhanced map with the approximated image to generate an enhanced image.

14 Claims, 7 Drawing Sheets

GENERAL IMAGE ENHANCEMENT FRAMEWORK

BACKGROUND

1. Field of the Invention

The invention relates generally to the field of image processing. More specifically, the invention relates to the enhancing of images.

2. Related Art

The goal of image enhancement is to process an original image (such as that captured by a scanner or digital camera) in a manner such that the processed (i.e., enhanced) image is more suitable for a desired application. Generally, image enhancement covers various techniques to improve the visual appearance of the original image or perhaps to convert the original image into a form better suited for human and machine analysis. For instance, image enhancement may be used to clarify image details that are blurred due, for example, to a focusing. Such removal of "noise" from the image is often an inexact process leading to inadvertent removal of important image information along with noise. Recently, more advanced approaches at noise removal image enhancing have been developed such as "A New Edge-Detection Based Noise Removal Algorithm," Ser. No. 08/986,761, filed Dec. 8, 1997.

Even with such developments, image enhancement is an inexact science. A major hurdle in image enhancement is the characterization or prediction in an image of accurate image details and false image details. For instance, in one image what may be detected as a bleeding of colors may be natural progression of color in another. Some image enhancement techniques operate upon an entire image in its original form, however, most operate upon a "color interpolated" version of the image. This is particularly true of digitally scanned or captured images which are captured in a Bayer pattern. In the Bayer pattern, each pixel location has the intensity level only one of three color components Red, Green or Blue. The Bayer pattern image is then "color interpolated" such that each pixel's missing color components are approximated to give each pixel a full "color" (Red, Green and Blue intensity). However, such techniques often introduce error or noise. Thus, enhancing an image after color interpolation may not yield very accurate results due to possible distortions relative to the captured image. Thus, there is a need for a general framework to perform image enhancement so as to increase the techniques effectiveness.

SUMMARY

What is disclosed is a method comprising forming an approximated image from an original input image, forming a pre-enhancement map by differentiating the approximated image from the input image, enhancing the pre-enhancement map according to an image enhancement technique forming an enhanced map thereby, and combining the enhanced map with the approximated image to generate an enhanced image.

BRIEF DESCRIPTION OF THE DRAWINGS

The objects, features and advantages of the method and apparatus for the present invention will be apparent from the following description in which.

DETAILED DESCRIPTION

Figure 1:
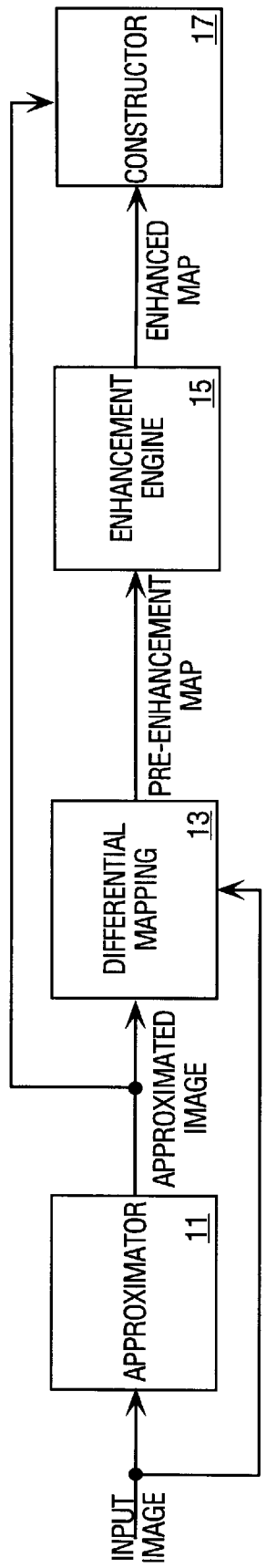
FIG. 1 illustrates an embodiment of the invention.

FIG. 1 illustrates an embodiment of the invention. According to FIG. 1, approximator 11 receives an input image and generates at its output an approximation of the image. The approximator 11 may be in anticipation of the image enhancement to be performed. For example, in the case of noise reduction image enhancement, approximator 11 may incorporate a low pass filter that filters the input image for high frequency image content of which noise is often a primary part. In another example, approximator 11 may be one that applies a moving window average on the input image to generate a "smoother" (less jogged) version of the input image. Approximator should be designed to generate a version of the image that has a higher likelihood of containing visually important image details that should not be distorted or misinterpreted during image enhancement.

With the approximated image thus generated the input image and the approximated image are supplied to differential mapping 13 that uses the images to form a pre-enhancement map. For instance, in one embodiment, differential mapping 13 may incorporate a subtractor that subtracts the approximated image (pixel-by-pixel) from the input image to form the pre-enhancement map. The pre-enhancement map comprises differential information of the input image and the approximated image thus eliminating features common to both. In the case of noise reduction image enhancement, the pre-enhancement map may include some true image information along with noise that is to be reduced. the level of true image information other than noise contained in that pre-enhancement map would thus be dependent on the effectiveness of approximator. For an ideal approximator, the differential mapping mainly yields the noise present in the image. Since this design would be typically known, the design factors may be taken into consideration when parameterizing (such as setting threshold values for edge, noise discrimination).

An enhancement engine 15 receives the pre-enhancement map at its input to process the map into an enhanced map. In noise reduction, for instance, an assumption may be made that noise is random and pathological, thus, by taking portions of the noise map and analyzing the gradient among the group of pixels in the portion (i.e., whether the gradient has passed a particular threshold), segregation can occur as to which pixels should be considered as noise and which pixels should belong to the true image. This process is made considerably more effective since the pre-enhancement map removes much of the true image information, leaving mostly noise if the approximator is designed effectively. Thus, the enhancement engine 15 operates upon a logically reduced set of pixels. Those pixel locations in which the corresponding intensity value of the approximated image matches the original input image, the pre-enhancement map will show a zero. For instance, in such a case, these zero pixels can be clearly identified by the enhancement engine 15 as not being noise and therefore, not removed. One key feature of the invention is the application of an enhancement technique not upon the input image, but upon a pre-processed image which contains mainly noise information and less edge information in the case of noise reduction, or leaves only edges in the case of edge enhancement.

A constructor 17 then combines the approximated image with the enhanced map (from enhancement engine 15) to form the enhanced image. Constructor 17 may be an adder that adds the enhanced noise map to the approximated image. If the enhancement has been properly performed, true image information, other than noise, of the input image is retained in the approximated image thereby generating a better quality enhanced image than of the enhancement engine operated directly on the input image itself.

Figure 2:
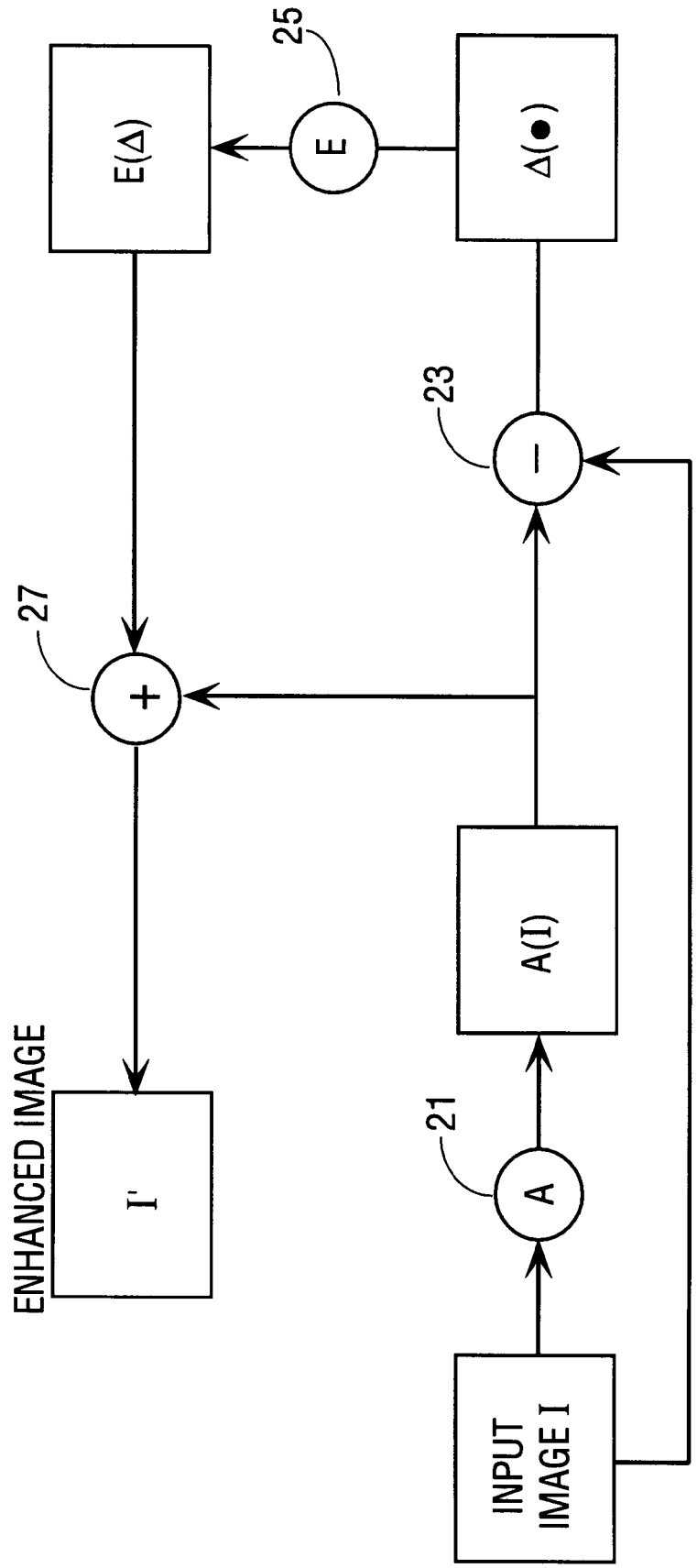
FIG. 2 is an example of an embodiment of the invention.

FIG. 2 is an example of an embodiment of the invention.

FIG. 2 typifies a noise reduction enhancement according to the framework shown in FIG. 1. In FIG. 2, an input image I is sent to an approximation modeler A21. Approximation modeler A21 can apply low pass filtering or a moving windowed average to isolate certain image information. The approximated image A(I) generated by the approximation modeler is then subtracted pixel-by-pixel using a subtractor 23 from the input image. This gives a Δ or differential image (referred to as "pre-enhanced map"). The Δ is then enhanced by enhancer 25. The enhanced Δ, E(Δ) (also referred to as "enhanced map") is then combined by adder 27 to the approximated image A(I) to form the enhanced image I'. Some advantages to this enhancement technique include a potential reduction in computation since the enhancement is being performed on a map that may contain many zero values. Even though these zero values are considered, the speed of calculation becomes increased since the bit depth, i.e., the number of bits used to deal with those values from a computational standpoint is reduced. Another potential advantage is the improvement of whatever enhancement technique is employed in relation to conventional image enhancement frameworks when that same enhancement technique is applied upon the original image. Thus, for a given enhancement technique, the described methodology will yield an improved image due to a more optimized enhancement.

Figure 3:
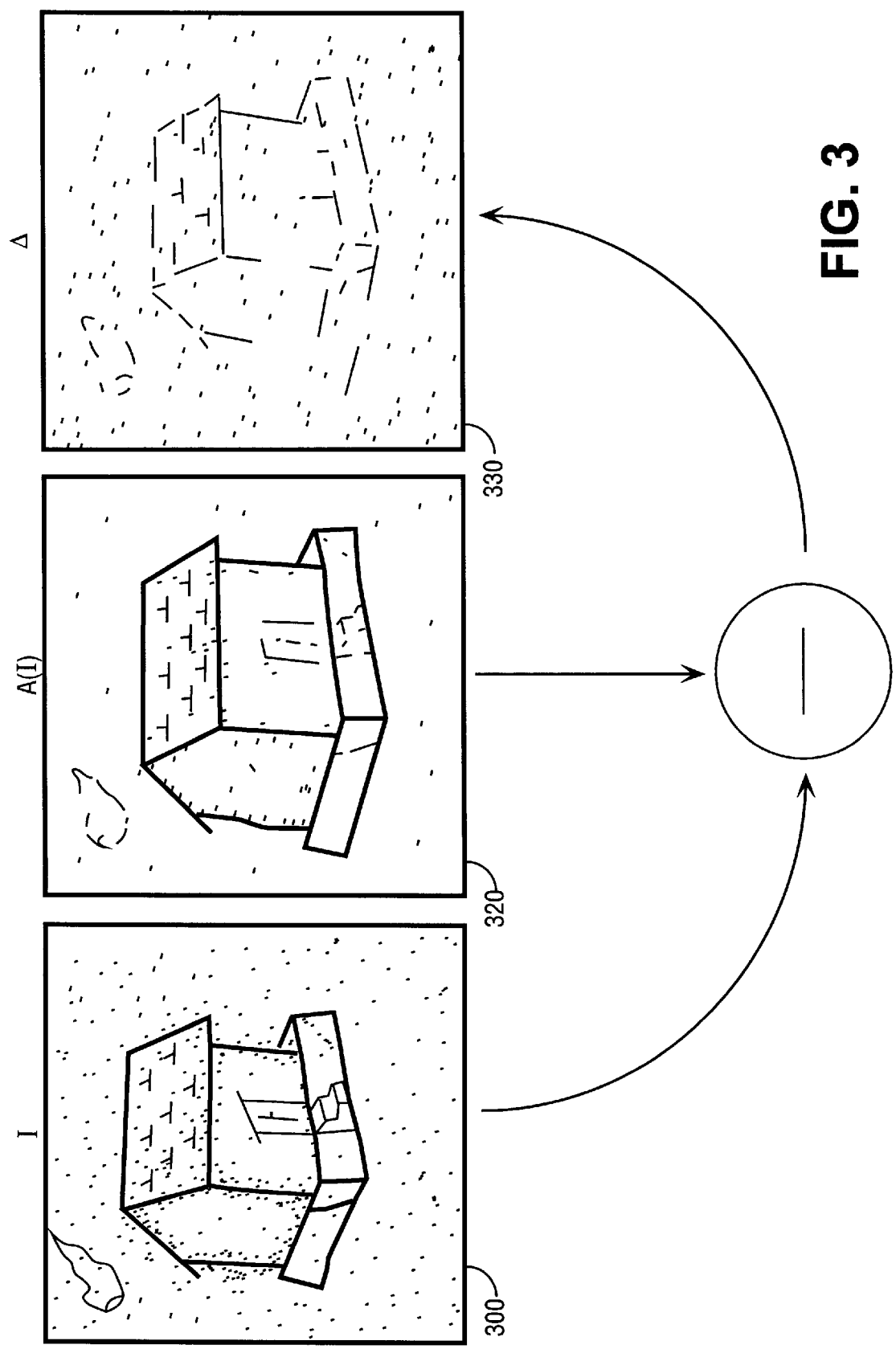
FIG. 3 shows an original input image, an approximated image and a differential image (pre-enhancement map).

FIG. 3 shows an original input image, an approximated image and a differential image (pre-enhancement map).

FIG. 3 shows an original input image 310 that may have been scanned in, captured or otherwise synthetically generated. Input image 310 has several characteristic features. Intended to represent the image of a house, the input image 310 also contains speckled noise in the environment surrounding the house. Notably, input image 310 shows speckled noise distributed also near edges of the house in the same vector direction as those edges. In typical noise reduction enhancement such noise would be difficult to property distinguish from the edges themselves. According to the invention, a smooth version of the image is created. This "approximated image" 320 still shows the major features of the house, such as the edges and smooths out the edges and noise directly adjacent to those edges. As a result, the approximated image 320 may be slightly blurred, i.e., the edge definition will not be as great as in input image 310. As described above, the approximated image 320 is subtracted pixel-by-pixel from the input image 310. The result therefrom is a pre-enhancement map (Δ) which contains those edges and noise information that were eliminated due to the approximation. The pre-enhancement map 330 contains mostly noise, in large part, due to the effectiveness of the smoothing performed to generate the approximated image 320. In pre-enhancement map 330, a faint outline of the edges of the house can be noticed. These faint edges are not present in the approximated image (relative to the total input image).

Figure 4:
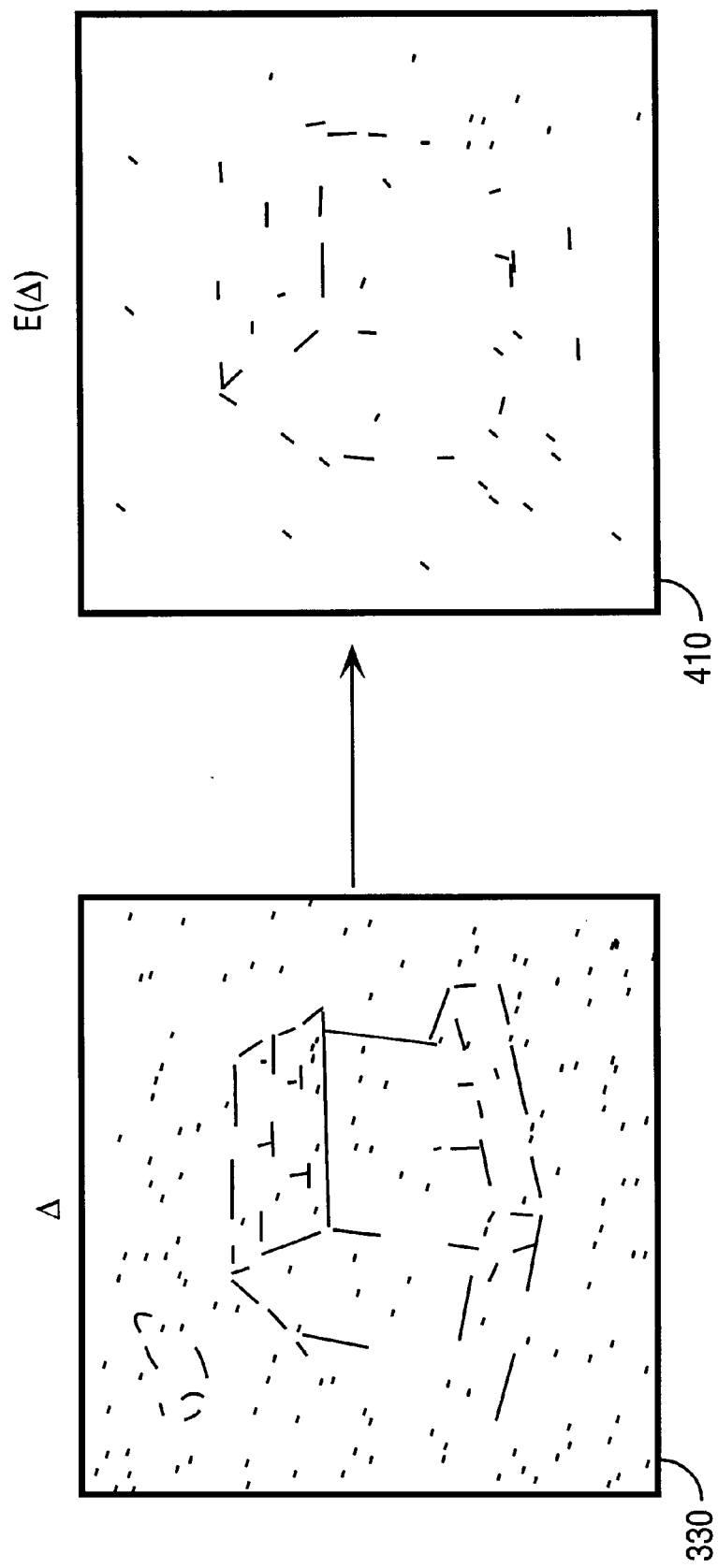
FIG. 4 shows a pictorial view of the generation of an enhanced map.

FIG. 4 shows a pictorial view of the generation of an enhanced map. The approximated image 320 generated in FIG. 4 consists of both noise and faint edge information of the original input image 310. According to an embodiment of the invention, rather than employing an enhancement such as noise reduction to the input image, the enhancement technique is applied to pre-enhancement map 330 to generate an enhanced map 410. As a result, the noise removal performed may be more efficient and more effective. The enhanced map 410 that is generated by applying noise reduction to pre-enhancement map 330 shows elimination of a majority of the noise and retention partially, of those faint edges of the house. Notably, the speckled noise immediately adjacent the edges of the house are removed.

Figure 5:
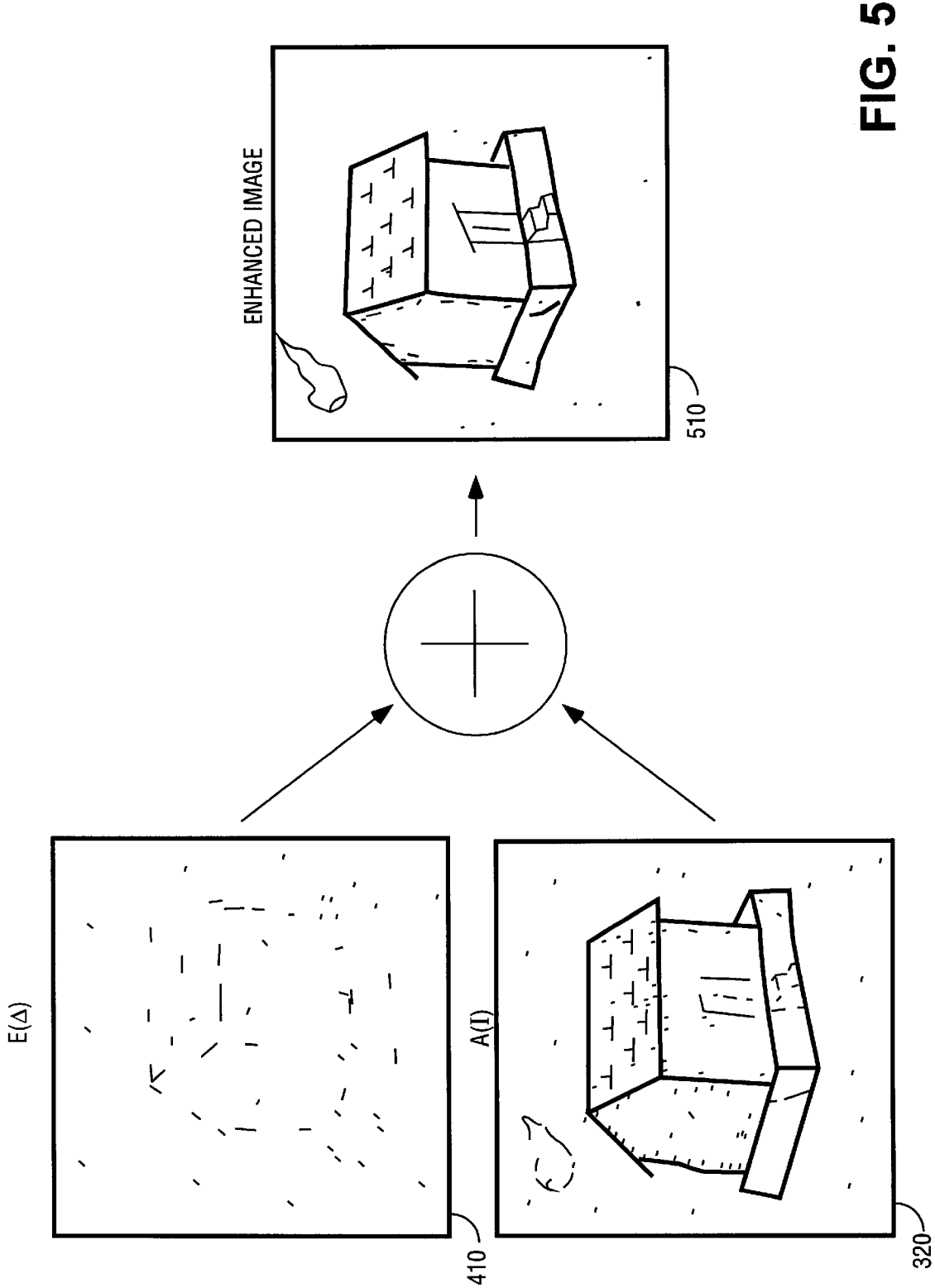
FIG. 5 is a pictorial view of the generation of the enhanced image.

FIG. 5 is a pictorial view of the generation of the enhanced image.

The approximated image 320 is added to the enhanced map 410 to generate the enhanced image 510. Enhanced image 510 shows sharper edge features, and a marked reduction in levels of noise. Particularly of note is the reduction of noise along the edge features of the house. Enhanced image 510 is a pixel-by-pixel sum of the intensity values of the enhanced map 410 and the approximated image 320.

Figure 6:
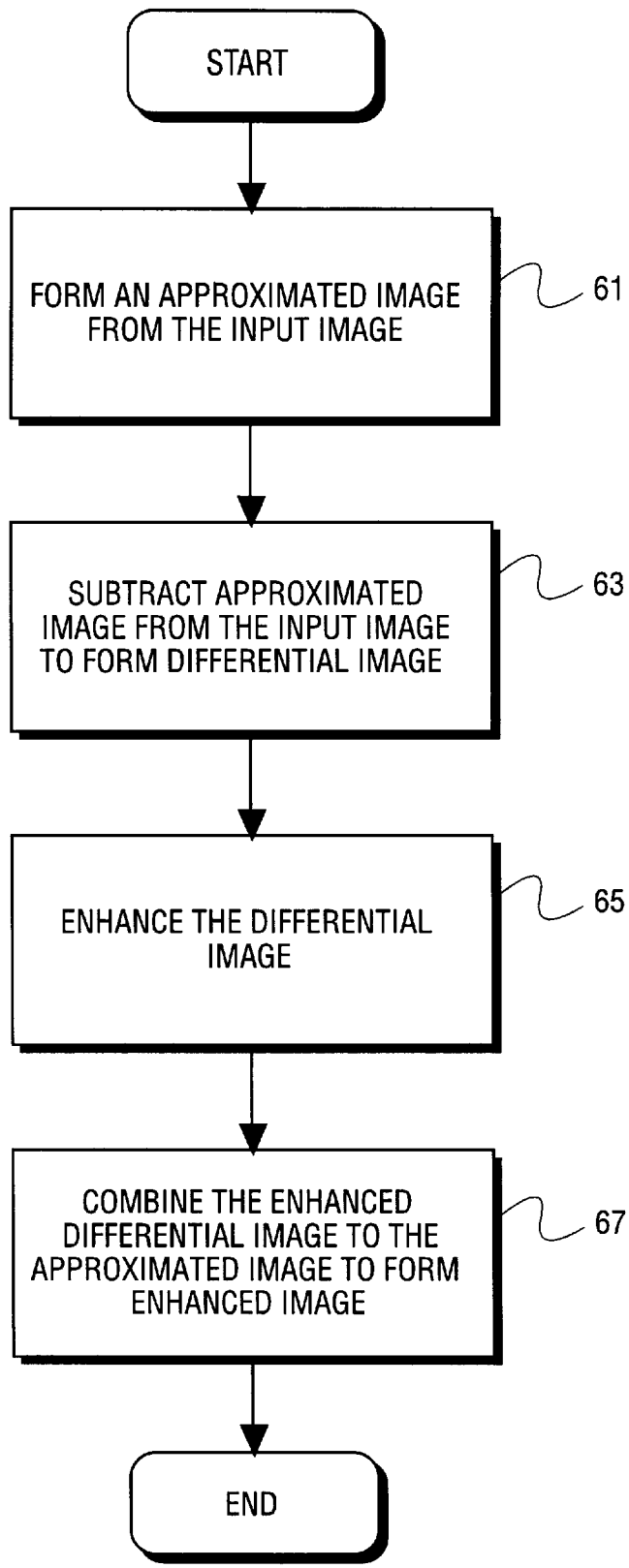
FIG. 6 is a flow chart that describes the framework for generating an enhanced image from an input image according to an embodiment of the invention.

FIG. 6 is a flow chart that describes the framework for generating an enhanced image from an input image according to an embodiment of the invention. In block 61, an approximated image of an input image is formed in accordance with a designed approximation model. Because a two step approach is taken (i.e., an approximation step and an enhancement step), a loosely modeled approximation block usually results in a tightly modeled enhancement block and vice versa. For instance, for the purpose of noise reduction, it is desirable to design the approximation model such that minimal noise is retained in the approximated image since no enhancement is generally performed in the approximated image.

In block 63, a differential image is generated by a differential subtracting the approximated image from the input image. Since generating a pre-enhancement map eliminates common image features, less information needs to be analyzed in the enhancement process.

Thus, in block 65, the pre-enhancement map is then enhanced. To recover that image information lost to the differential process, the approximated image is combined with the enhanced map to generate an enhanced image of the input image (block 67).

Figure 7:
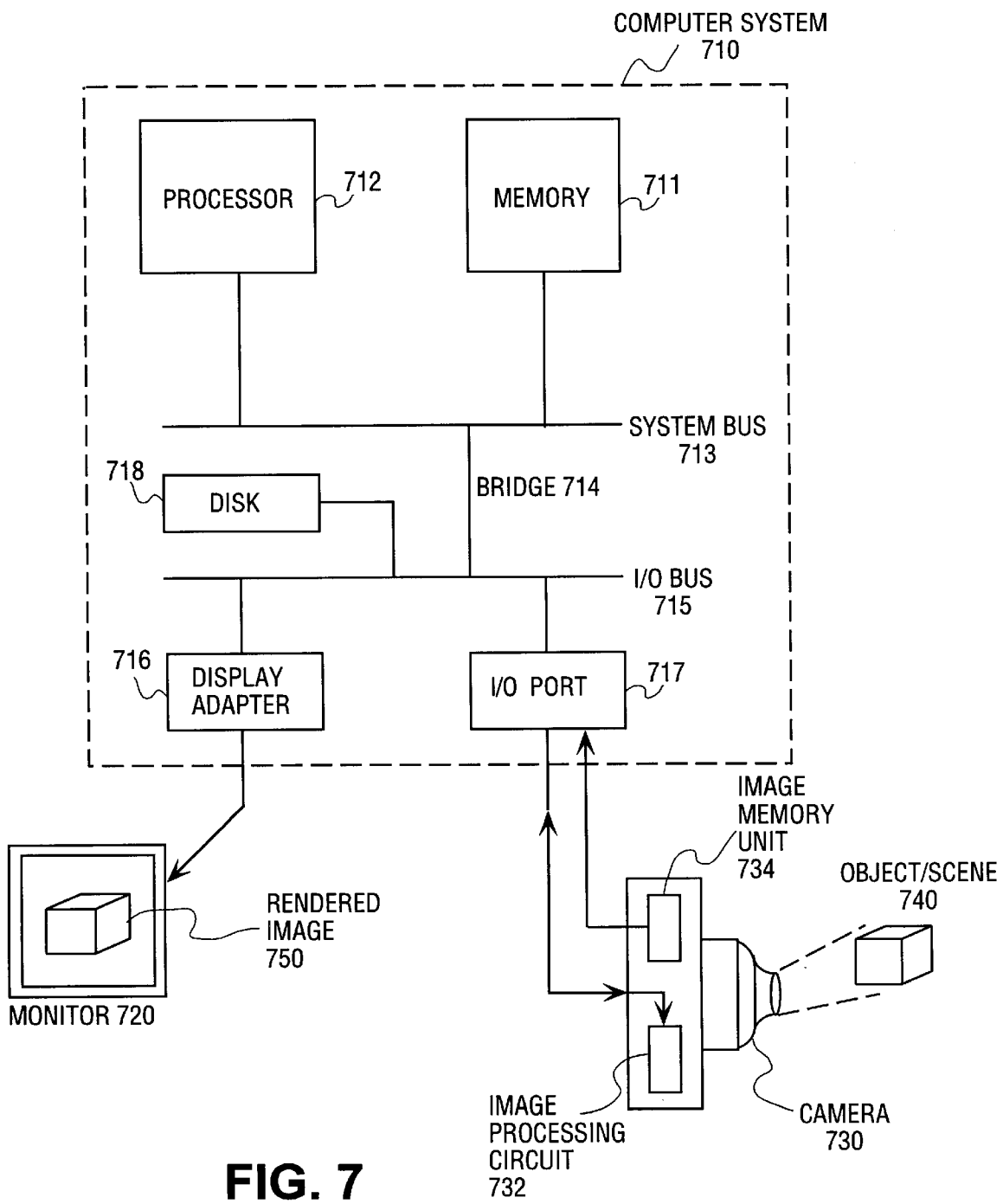
FIG. 7 is a system diagram of an embodiment of the invention.

FIG. 7 is a system diagram of an embodiment of the invention.

FIG. 7 illustrates a computer system 710, which may be any general or special purpose data processing machine such as a PC (personal computer), coupled to a camera 730. Camera 730 may be a digital camera, digital video camera, or any image capture device or imaging system, and is utilized to capture a sensor image of an object or scene 740. Essentially, captured images are compressed and processed by an image processing circuit 732 so that they can be efficiently stored in an image memory unit 734, which may be a RAM or other storage device such as a fixed disk, memory card, etc. In most digital cameras, raw images obtained from the image capture mechanism such as a sensor are stored first on camera 730 and downloaded later to be output, displayed, or manipulated. This allows the camera 730 to capture the next object quickly without additional delay. One convenient raw image representation is the Bayer pattern in which each pixel has one of three (R, G or B) values.

In one embodiment, an image is captured by camera 730 as a raw Bayer pattern and then compressed into some other format. Image enhancement according to one embodiment of the invention operates as follows. First, the compressed image is downloaded from camera 730 through I/O port 717 to a disk 718 or other device on the computer system 710. The compressed image is decompressed on computer system 710. Then, the computer system performs image enhancement on the recovered Bayer pattern image prior to any color interpolation by executing instructions in accordance with the framework in the various embodiments of the invention.

The methodology described in the various embodiments of the invention may be executed using a processor 712 such as the Pentium™ (a product of Intel Corporation) and a memory 711, such as RAM, which is used to store/load instruction, addresses and result data. The application used to perform noise removal on the CFA image may be an executable module compiled from source written in a language such as C++. The instructions of that executable module, which correspond with instructions that aid in enhancing images by applying a chosen enhancement technique on a differential map rather than the original full image may be stored to a disk 718 or memory 711, and thus may be loaded through some computer-readable medium. It would be readily apparent to one of ordinary skill in the art of computer sciences to program a determining machine to carry out the interpolation methodology described in various embodiments of the invention.

Computer system 710 has a system bus 713 which facilitates information transfer to/from the processor 712 and memory 711 and also has a bridge 714 which couples system bus 713 to an I/O bus 715. I/O bus 715 connects various I/O devices such as a display adapter 716, disk 718 and an I/O port, such as a serial port. Many such combinations of I/O devices, buses and bridges can be utilized with the invention and the combination shown is merely illustrative of one such possible combination.

When an image, such as an image of object/scene 740, is captured, the image is sensed as R, G, and B pixels into, for instance, the Bayer pattern. These pixel values are sent to the image processing circuit 732. Image processing circuit 732 consists of ICs and other components which execute among other functions, an image compression scheme to reduce the size of the transfer between camera 730 and computer system 710. When the user or application desires/requests a download of images, the compressed images stored in the image memory unit are transferred from image memory unit 734 to the I/O Port 717. I/O port 717 uses the bus-bridge hierarchy shown (I/O bus 715 to bridge 714 to system bus 713) to temporarily store the image data into memory 711 or, optionally, to disk 718. The compressed images are decompressed by suitable application software (or dedicated hardware) and may utilize processor 712 for doing so. The decompressed image data will be recovered as Bayer pattern image data similar or identical to the image data as captured by the sensor of camera 730.

The downloaded image once decompressed will thus have pixels in their raw on-color-component-per-pixel form. If a noise removed or otherwise enhanced image is desired to be output on monitor 720, then that noise removal technique or image enhancement according to the various embodiments of the invention should be performed prior to forming full color pixels through color interpolation and should use the differential enhancement framework described above. The downloaded and decompressed image is enhanced by one of the techniques as discussed above, and thus the image is transformed into an enhanced image. The enhanced image data set may be stored in memory 711 or disk 718 for further processing. Once the enhancement is performed throughout, then the data set may be operated upon by the color interpolation process, and if desired, the original (recovered) image discarded. Image enhanced and then color interpolated rendered image 750 will be rendered with better detail (e.g., sharper edges and less noise), given adequate display devices (monitor 720 and adapter 716) and will thus, more closely resemble the original object/scene 740. The enhanced and color interpolated image may be stored onto disk 718, memory 711 and/or output directly to monitor 720 after being rendered through display adapter 716.

The computer program code for image enhancement may be packaged onto a removable computer-readable medium such as floppy disk or CD-ROM and may accompany software that performs the decompression of images downloaded from camera 730. As with any other software, it can be downloaded/distributed over a network on communications system, or can be available in firmware. These downloaded images can be enhanced so that the images will more accurately visually present the object/scene 740 to the user. Such image enhancement techniques may alternatively also be implemented in hardware on the camera 730 itself.

In an alternative embodiment of the invention, the image processing circuit 732 can be adapted to include circuitry for performing noise removal or other image enhancement on-camera, such that the stored image in image memory unit 734 is an enhanced image. In such an embodiment, the image may be enhanced at any stage in the image processing. In such a hardware embodiment, each enhanced image pixel, as it is being determined, can be written back directly to the image memory unit 734 or other storage mechanism. Further, the approximated map, pre-enhancement map and other such intermediate result data can also utilize image memory unit 730. The methods described above for enhancing images are capable of being implemented in VLSI (Very Large Scale Integration) or other integrated circuitry. The image enhancement framework presented in various embodiments of the invention have the advantage of potential direct hardware implementation since unlike traditional enhanced techniques, they are designed to be applicable to a Bayer pattern raw image. The image enhancement framework may also be executed after color interpolation if so desired. Any number of image enhancement techniques, such as artifact reduction, edge sharpening color bleeding reduction and so on may utilize the framework discussed in the invention such that these techniques in whatever form employed operate more effectively than in conventional image enhancement.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense. Therefore, the scope of the invention should be limited only by the appended claims.

What is claimed is:

1. A method comprising:

forming an approximated image from an original input image;

forming a pre-enhancement map by differentiating said approximated image from said input image;

enhancing said pre-enhancement map according to an image enhancement technique forming an enhanced map thereby; and combining said enhanced map with said approximated image to generate an enhanced image.

2. The method according to claim 1, wherein forming said approximated image comprises low pass filtering said input image.

3. The method according to claim 1, wherein forming said approximated image comprises averaging portions of said input image in a moving window manner.

4. The method according to claim 1, wherein forming said pre-enhancement map comprises subtracting said approximated image from said input image.

5. The method according to claim 1, wherein combining comprises adding said enhanced map with said approximated image.

6. A method according to claim 1, wherein said enhancing includes noise removal.

7. A method according to claim 1, wherein said enhancing includes edge sharpening.

8. A system comprising:

an approximator configured to generate an approximated image of an input image;

a differential mapping module coupled to said approximator, said differential mapping module configured to generate a pre-enhancement map from said input image and said approximated image;

an enhancement module coupled to said differential mapping module, configured to enhance said pre-enhancement map and form an enhancement map therefrom; and a constructor coupled to said enhancement module, configured to combine said enhanced module map and said approximated image outputting an enhanced version of said input image therefrom.

9. The system according to claim 8, wherein said approximator is a low pass filtering.

10. The system according to claim 1, wherein said approximator is configured to apply a moving windowed average on said input image.

11. The system according to claim 8, wherein said differential mapping module is a subtractor.

12. The system according to claim 8, wherein said constructor is an adder.

13. A system according to claim 8 incorporates wherein said enhancement module provides noise removal.

14. An article comprising:

a computer readable medium having instructions stored thereon which, when executed by a processor, cause:

generating an approximated image from an input image;

generating a pre-enhancement map by differentiating said approximated image from said input image;

enhancing said pre-enhancement map to form an enhanced map; and combining said enhanced map with said approximated image to form an enhanced image.

* * * * *